United States Patent
Erlingsson

(10) Patent No.: US 7,191,469 B2
(45) Date of Patent: Mar. 13, 2007

(54) METHODS AND SYSTEMS FOR PROVIDING A SECURE APPLICATION ENVIRONMENT USING DERIVED USER ACCOUNTS

(75) Inventor: Ulfar Erlingsson, San Francisco, CA (US)

(73) Assignee: Green Border Technologies, Mountain View, CA (US)

( * ) Notice: Subject to any disclaimer, the term of this patent is extended or adjusted under 35 U.S.C. 154(b) by 885 days.

(21) Appl. No.: 10/170,591

(22) Filed: Jun. 14, 2002

(65) Prior Publication Data
US 2003/0233544 A1    Dec. 18, 2003

Related U.S. Application Data

(60) Provisional application No. 60/380,409, filed on May 13, 2002.

(51) Int. Cl.
H04L 9/00       (2006.01)

(52) U.S. Cl. .......................... 726/27; 726/30
(58) Field of Classification Search .............. 726/29, 726/30, 27
See application file for complete search history.

(56) References Cited

U.S. PATENT DOCUMENTS

| | | |
|---|---|---|
| 5,263,147 A | 11/1993 | Francisco et al. |
| 5,265,206 A | 11/1993 | Shackelford et al. |
| 5,537,548 A | 7/1996 | Fin et al. ............... 395/200.04 |
| 5,619,639 A | 4/1997 | Mast ........................ 395/326 |
| 5,634,102 A | 5/1997 | Capps ....................... 395/334 |
| 5,760,769 A | 6/1998 | Petrie ........................ 345/334 |
| 5,761,477 A | 6/1998 | Wahbe et al. |
| 5,764,985 A | 6/1998 | Smale ........................ 395/682 |
| 5,768,519 A * | 6/1998 | Swift et al. ................. 709/223 |
| 5,787,428 A * | 7/1998 | Hart ............................. 707/9 |
| 5,797,128 A | 8/1998 | Birnbaum |
| 5,828,893 A | 10/1998 | Wied et al. |
| 5,832,263 A | 11/1998 | Hansen et al. ............. 395/681 |
| 5,845,129 A | 12/1998 | Wendorf et al. |
| 5,913,024 A | 6/1999 | Green et al. |
| 5,915,085 A | 6/1999 | Koved |

(Continued)

FOREIGN PATENT DOCUMENTS

WO    WO 98/21683 A    5/1998

OTHER PUBLICATIONS

Anurag Acharya, et al., "MAPbox: Using Parameterized Behavior Classes to Confine Untrusted Applications", Proceedings of the 9th USENIX Security Symposium, Aug. 14-17, 2000, 17 pages.

(Continued)

Primary Examiner—Matthew Smithers
(74) Attorney, Agent, or Firm—Finnegan, Henderson, Farabow, Garrett, & Dunner LLP

(57) ABSTRACT

A secure application environment ("SAE") may be created by using derivation transformations ("DTs") to create a derived user account ("DUA") based on the original user account ("OUA"). An SAE may be created by selecting for each resource whose access is controlled by the OUA a DT that provides security for that resource without, whenever possible, reducing the functionality of the system as a whole, and creating a means for accessing a version of each resource based on the selected DT that may be accessed by an insecure actor.

69 Claims, 7 Drawing Sheets

U.S. PATENT DOCUMENTS

| | | | |
|---|---|---|---|
| 5,918,018 | A | 6/1999 | Gooderum et al. |
| 5,956,507 | A | 9/1999 | Shearer, Jr. et al. ........ 395/674 |
| 5,974,470 | A | 10/1999 | Hammond ................. 709/305 |
| 5,991,877 | A | 11/1999 | Luckenbaugh |
| 6,023,721 | A | 2/2000 | Cummings |
| 6,092,192 | A | 7/2000 | Touboul |
| 6,141,754 | A | 10/2000 | Choy |
| 6,154,844 | A | 11/2000 | Touboul et al. |
| 6,167,520 | A | 12/2000 | Touboul |
| 6,289,458 | B1 | 9/2001 | Garg et al. |
| 6,385,724 | B1 | 5/2002 | Beckman et al. |
| 6,453,418 | B1 * | 9/2002 | Ooki et al. ................... 726/27 |
| 6,505,300 | B2 | 1/2003 | Chan et al. |
| 6,513,111 | B2 * | 1/2003 | Klimczak et al. .............. 713/1 |
| 6,529,985 | B1 | 3/2003 | Deianov et al. ............ 710/260 |
| 6,587,888 | B1 | 7/2003 | Chieu et al. ................ 709/313 |
| 6,772,350 | B1 | 8/2004 | Belani et al. |
| 2002/0019941 | A1 | 2/2002 | Chan et al. |
| 2002/0099952 | A1 | 7/2002 | Lambert et al. |

OTHER PUBLICATIONS

Barry Boehm, "Managing Software Productivity and Reuse," University of Southern California, Sep. 1999, pp. 111-113.

P. Deutsch, et al., "A Flexible Measurement Tool for Software Systems," Information Processing (Proceedings of the IFIP Congress), 1972, pp. 320-326.

Guy Edjlali, et al., "History-based Access Control for Mobile Code," 5th Conference on Computer & Communications Security, 1998, pp. 38-48.

Úlfar Erlingsson, et al., "IRM Enforcement of Java Stack Inspection," IEEE, 2000, 10 pages.

Úlfar Erlingsson, et al., "SASI Enforcement of Security Policies: A Retrospective," Department of Computer Science, Cornell University, pp. 87-95.

David Evans, et al., "Flexible Policy-Directed Code Safety," MIT Laboratory for Computer Science, IEEE, 1999, 14 pages.

Timothy Fraser, et al., "Hardening COTS Software with Generic Software Wrappers," TIS Labs at—Network Associates, Inc., IEEE, 1999, 15 pages.

Ian Goldberg, et al., "A Secure Environment for Untrusted Helper Applications (Confining the Wily Hacker)," Proceedings of the Sixth USENIX UNIX Security Symposium, Jul. 1996, 14 pages.

Robert P. Goldberg, "Survey of Virtual Machine Research," IEEE Computer, Jun. 1974, vol. 7, No. 6, pp. 34-45.

Manoj Lal, et al., "A Scheduling Scheme for Controlling Allocation of CPU Resources for Mobile Programs," University of California, Davis, Aug. 31, 1999, pp. 1-33.

Jerome H. Salzter, et al., "The Protection of Information in Computer Systems", Proceedings of the IEEE 63, Sep. 1975, 30 pages.

Robert Wahbe, et al., "Efficient Software-Based Fault Isolation," Computer Science Division, University of California, SIGOPS, 1993, pp. 203-216.

Islam, N. et al., "A Flexible Security System for Using Internet Content," IEEE, Sep./Oct. 1997, pp. 52-59.

* cited by examiner

METHODS AND SYSTEMS FOR PROVIDING A SECURE APPLICATION ENVIRONMENT USING DERIVED USER ACCOUNTS

RELATED APPLICATIONS

This application claims the benefit of priority of provisional application 60/380,409, filed May 13, 2002, which is expressly incorporated herein by reference.

TECHNICAL FIELD

This invention relates generally to user accounts in computer systems and, more particularly, to methods and systems for providing a secure application environment using derived user accounts.

BACKGROUND

The high cost of equipment in the early days of computing led to the development of time-shared computing systems that allowed multiple concurrent users to simultaneously access the computer systems. User accounts encapsulate the information particular to each individual user, such as the user's name, password, area of transient and persistent storage, configuration information, resource-usage quotas and other properties to be enforced on the user's behavior. By using user accounts, time sharing could be implemented without compromising the systems usability. Whereas previous computer system operations always directly affected the global state of the machine, operations on a user's behalf in systems implementing user accounts typically affect only the information in the user's account. In this manner, each user's actions became isolated from other users since, for the most part, they only affected the individual user's account information.

FIG. 1 illustrates the components in a conventional computer system implementing user accounts. Each operation that involves accessing the state of the system is discriminated to determine if the state being accessed is local to an individual user account or global to the entire system (and therefore shared between all user accounts). If access is to a user-local state, the discrimination procedure determines the context of the access operation, that is, which user's account information to access. In conventional systems, context may be determined by, for example, using a low-level indirection (for memory accesses), the current virtual memory page tables, or a user account reference in each process or thread control block (for system calls).

Since their invention, user accounts have proven very useful. They enhance usability when multiple individuals simultaneously use a computing system and allow for segregation of system activity based on intent. For example, conventional systems may use a supervisor user account, called "root," to run background services. Also, web-server activities may operate as "nobody," that is, a user account with very limited privileges. Additionally, user accounts are integral to maintaining the security of a multiple user computer system since they may be used to control which data a user may access or actions a user may perform.

User accounts allow multiple users on a computer or network to have access to resources based on the user's profile (security permissions, preferences, etc). Each user account has limited access to a set of resources and the account's use of those resources is protected from activity in other user accounts. For example, a network file system is a hierarchical collection of named resources (such as files and directories). Access to any part of the file system is regulated based on permissions applied to user accounts. If a directory is readable only by one user account, processes running in another user account will not be able to access the directory or any resources located (hierarchically) beneath it. In most conventional systems, actors in another user account cannot affect any resources anywhere below this protected directory. There are, of course, exceptions to this protection: some supervisory or administrative accounts (such as "root") may be able to circumvent permissions applied by other user accounts.

Modern operating systems also run each process in its own protected segment of memory. A process generally cannot access memory outside of its own protected area, and thus cannot insert or modify code running in another section of memory. Furthermore, if a process performs some malicious behavior or executes illegal instructions, the scope of the behavior is limited to the memory assigned to the process. It is typically not possible, for example, for the process to cause another process to execute arbitrary instructions.

Protected memory helps to isolate the instructions that a process executes, but it does not in itself prevent a process from accessing and modifying other system resources. User accounts can be used to limit the effects of actors, but only at the expense of preventing actors from doing potentially useful things. For example, if a user receives a spreadsheet in email, but the application is prevented from opening the spreadsheet with the actual user's preference to use very large fonts because of a vision impairment, the spreadsheet is not useful to the user. The user should be able to open this document in a spreadsheet application that knows all of the user's preferences (which are stored somewhere in the user's account). In fact, most conventional approaches to computer security, such as setting "user security preferences," using access control boundaries or restricted tokens in an operating system, or creating virtual environments, also have the undesirable side effect of limiting the actions of the user thereby decreasing the functionality and usability of applications.

SUMMARY

Consistent with the invention, a secure application environment in a computer system comprising at least one resource, the access to which is governed by a user account, may be created by determining if the at least one resource is within the secure application environment and, if the at least one resource is within the secure application environment, determining a transformation rule for the at least one resource based on the user account. A request to access the at least one resource may then be handled in accordance with the transformation rule for the at least one resource.

In certain embodiments, if the at least one resource is not within the secure application environment, the resource is added to the secure application environment. In certain embodiments, the transformation rule may be determined dynamically or based on the user account, resource type, and context of a request.

In certain embodiments, the transformation rule is determined based on the resource and may specify, for example, to copy at least some of the at least one resource to a new location relative to a root of the hierarchical namespace and access the copied resource in place of the at least one resource, to assigns a unique identifier to a copy of the at least one resource and specifies to access the copied resource in place of the at least one resource, or to redirect a request to access the at least one resource to a substitute resource. In certain other embodiments, the transformation rule specifies to mask some or all of the at least one resource and access the masked resource in place of the at least one resource.

DESCRIPTION OF THE DRAWINGS

The accompanying drawings, which are incorporated in, and constitute a part of the specification, illustrate implementations of the invention and, together with the detailed description, serve to explain the principles of the invention. In the drawings.

DETAILED DESCRIPTION

Figure 1:
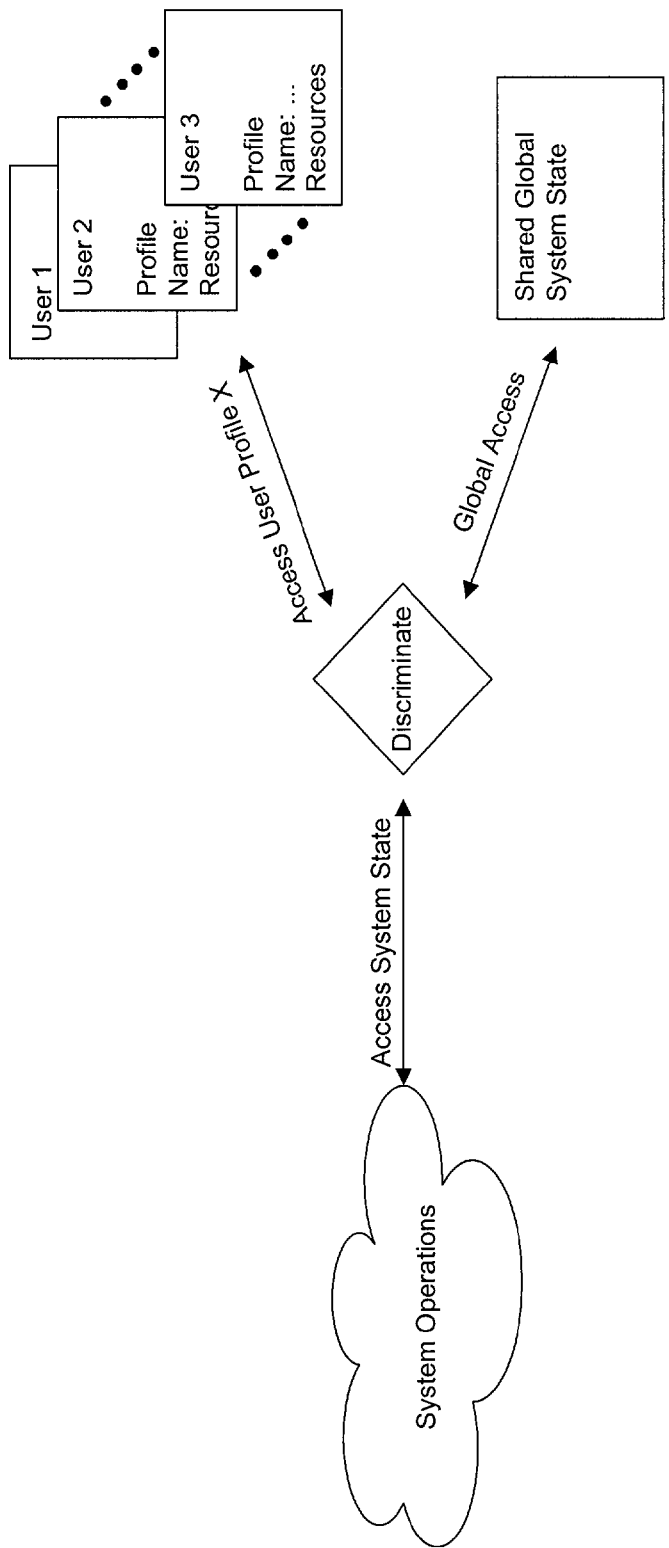
FIG. 1 is block diagram of a conventional system architecture 100 for performing operations accessing state in a multi-user system.

Methods, systems, and articles of manufacture consistent with features of the present invention allow the generation and use of derived user accounts ("DUA") in a computer system comprising an operating system. In particular, certain aspects consistent with the present invention provide derivation rules that define, among other things, how a DUA is linked to an existing original user account "OUA". Still further aspects consistent with the present invention provide derivation transformations which are computable functions for updating the state of a DUA based on its corresponding OUA or giving feedback from the state of a DUA to the state of its corresponding OUA. Through use of DUAs, methods, systems, and articles of manufacture consistent with features of the present invention allow users to introduce actors into their systems and achieve the full functionality of the actor. If an actor performs an unwanted or prohibited function, the behavior should not alter the user's system resources nor expose sensitive private data from the user's account thereby limiting the effects of a faulty or malicious actor on the system as a whole.

Reference will now be made in detail to implementations of the invention, examples of which are illustrated in the accompanying drawings. Wherever possible, the same reference numbers will be used throughout the drawings to refer to the same or like parts.

As is well-known by those skilled in the computer software arts, a conventional general purpose computer has an operating system that performs basic tasks, such as controlling peripheral devices, managing data storage, and policing the execution of software programs that operate on the computer. For example, operating systems enforce process priorities and prevent one program from interfering with another program. Operating systems also provide a means for communication between software programs. Operating systems allocate hardware to various programs running within the computer and act on exceptional conditions that occur during execution of a program. Computer programs access various libraries, file editors, compilers, and assemblers during execution under the direction of the operating system. The operating system also handles security issues, such as protection and access control. Exemplary operating systems include Microsoft's Windows®, UNIX®, Linux, Macintosh OS X, Palm OS®, Pocket PC, and the EPOC platform by Symbian. Windows is a registered trademark of Microsoft Corporation. UNIX is a registered trademark of The Open Group. Palm OS is a registered trademark of Palm, Inc.

In conventional computer systems, operating systems perform the functions mentioned above and others with the help of user accounts. A user account defines the actions a user can perform in the operating system and how the actions are performed. User accounts also establish the privileges, permissions, and rights granted to each user in a network. For example, user accounts control such actions as logging on to a computer, creating or accessing files, running programs, and saving changes to files. User accounts may be limited to a specific user, or specific limited group of users, or be granted to a system administrator. System administrator user accounts are generally reserved for people who have permission to make system-wide changes to the computer, install programs, and access all (or most) files on the computer or network. Persons with a system administrator account with broad permissions may, for example, create and delete user accounts, change most computer settings such as, for example, account passwords and access permissions of limited user accounts, and delete important files.

During operation of a computer, an operating system controls access to files, devices, memory, peripherals, and other system resources based on the user account information. For example, Windows 2000 uses login session tokens to identify the user account and security context of a process, thread, or other activity. During logon, Windows 2000 creates an initial token based on access permissions specified in the user account and attaches the token to the user's logon process. All programs, threads, or other activity instigated by the user, or those impersonating the user, inherit a propagated pointer to the initial token.

When a computer application requests access to a resource, the operating system requires that the application specify up front what type of access it is requesting (such as read, write, delete, create or others). The operating system can also determine which user controls the application and what type of access the application should be granted based on the corresponding user account. In other words, access to resources is, in many cases, specific to individual users. Therefore, when the application performs operations involving the object, the operations are only carried out if the user has permission to access the object in the requested way.

Derived User Accounts

Methods consistent with the present invention allow the use of derived user accounts (DUAs) for certain system operations. DUAs may have all of the properties of traditional user accounts including, but not limited to, its own state, distinct privilege and access control rules, its own unique identifier (such as a security token), and ownership of any system resources. In addition, DUAs are linked to at least one particular existing user account (the Original User Account, or OUA). Through use of a DUA, its OUA may be selectively isolated from system operations taking place in the DUA's context. Since the DUA is a legitimate user account, legacy processes will function correctly in a DUA context while modifications to the OUA can be limited through choice of derivation transformations ("DTs") specified by a set of derivation rules ("DRs").

Figure 2:
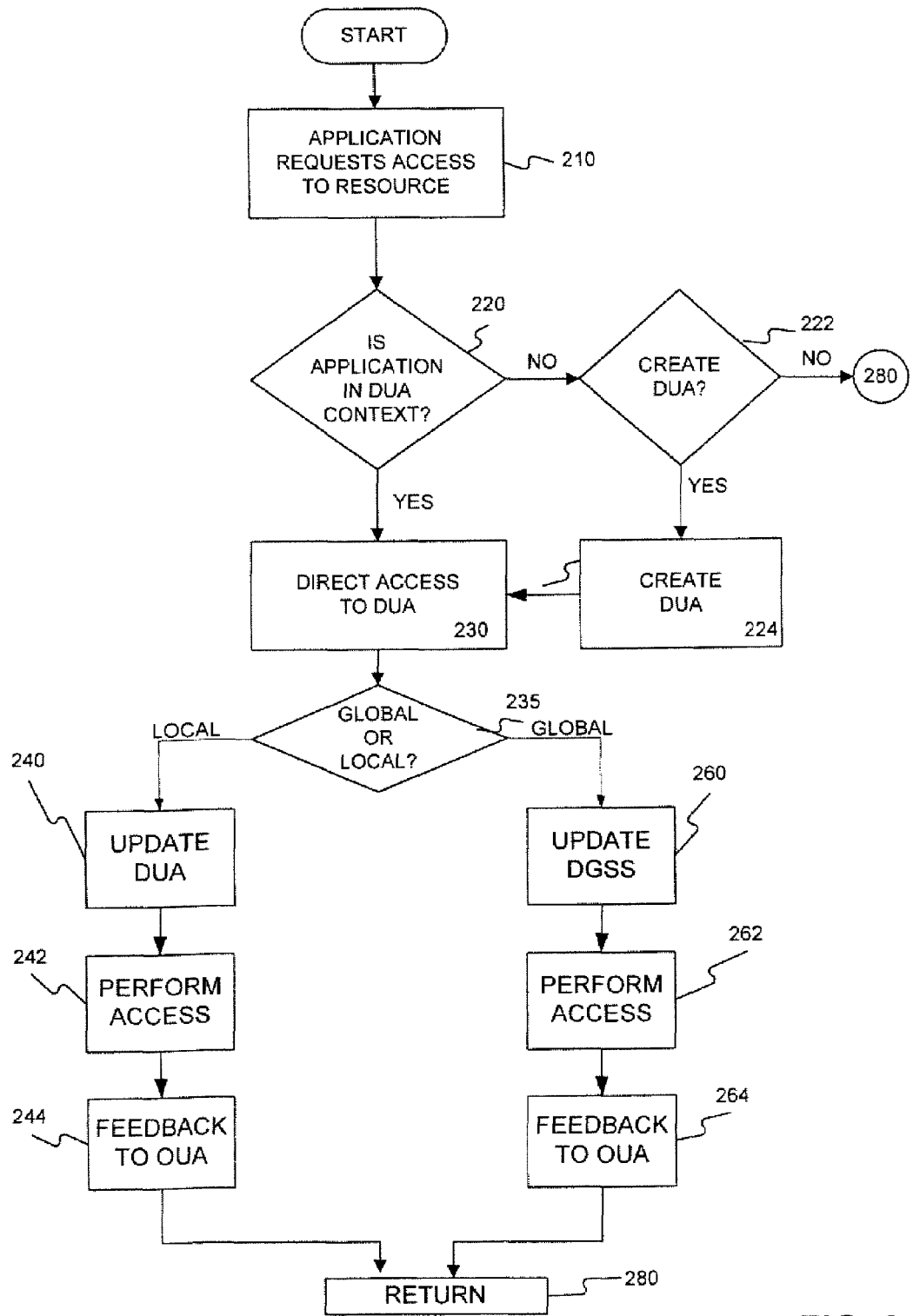
FIG. 2 is a flow diagram of a method for performing access operations using a derived user account consistent with the present invention.

FIG. 2 illustrates the steps of a method for accessing a resource using a derived user account consistent with the present invention. In one embodiment, a software application, P, requests access to a resource, X (step 210). A "resource" may be, for example, state information, such as data that lies in memory, file systems, registry configurations, other applications, processes, network ports, semaphores, window handles in graphical user interface ("GUI") systems, hardware devices such as a soundcard or printer, or other named abstractions. The system determines if the software application is already running in the context of a DUA (step 220). Methods for determining the context of an object, thread, or other activity are well known to those skilled in the computer software arts. For example, in Microsoft Windows 2000, determining whether a thread is running under a local administrator account may be accomplished by examining the access token that is associated with the thread, the thread's identifier, the thread's creation time, or any other identifier that may be mapped to a specific user account.

If the software application is not running in the context of the DUA, the application determines if a DUA should be "created" (step 222). If the application determines that a DUA should not be created, the application continues normally as in step 280.

If it is determined that a DUA should be created (step 224), a DUA may be created according to any of the following exemplary embodiments. In some embodiments consistent with the present invention, a DUA shell may be created by, for example, creating a new user account, "user 2," that may comprise a set different than, or a subset of, the rights and permissions afforded the original user. A DUA shell is the context and the mechanism for propagating the context. The context includes, for example, all information that would normally be associated with an operation in the OUA, such as user credentials, process id, and other information. DUA shells allow for the automatic propagation of DUA context to all DUA activity, for example, processes or threads, whether they be created directly or indirectly as a result of DUA activity. The initial DUA shell may have been established before run-time or established dynamically during operation of the operating system. The creation of the DUA shell may have been invoked randomly or triggered by some event, such as a write access operation.

In this exemplary embodiment, the new user account may comprise rights and permissions that the original user does not have. The new user account, or DUA shell, may be created, for example, by using the existing user account mechanisms in the operating system. Additionally, the ownership of files or objects created or owned by user 2 may need to be modified post-creation to allow the corresponding OUA to have access, if access by OUA is desired. Similarly, user 2 may, by default, access to none or all of the files or objects created or owned by the OUA.

In another exemplary embodiment, a DUA shell may be created by creating a new, possibly restricted, login session or token for the OUA (called OUA', or "OUA prime"). OUA' is distinct and separate from the original OUA session or token, but may have all the same privileges for resources as the OUA, such as, for example, ability to use the same display. In some exemplary embodiments, OUA' may have fewer capabilities than OUA (for example, may not be able to shut down the machine or modify the screen resolution). However, by creating a DUA shell in this fashion in, for example, the Microsoft Windows operating system, the activity of OUA' may be discriminated as the associated token that is automatically propagated to any processes, thread, or other activity created directly or indirectly by OUA.

In yet another embodiment, a process group (in Windows 2000, a "job") may implement the DUA shell. As well as being able to implement a DUA shell, a process group or job may also enforce quotas on resource consumption and, in other ways, control access to resources. For example, a process group or job may perform the automatic context propagation needed for discrimination of the DUA activity.

In still another embodiment, a DUA shell may be created by annotating certain OUA activity as actually belonging to the DUA. Annotation occurs when new OUA activity (that actually belongs to the DUA) is initiated such as, for example, on the creation of a thread, process, or other activity, or the impersonation of the OUA. Annotation may take the form of unique bits or an arbitrary sequence of bits associated with the OUA activity. One example is the use of a distinguished entry in handle tables or file descriptor tables. The annotation may be placed on any one or more components of the OUA activity. In addition, the annotation may be placed on any information in the kernel thread control block ("TCB") or kernel process control block ("PCB"), assuming execution in an operating system with a protected mode kernel. One benefit of annotating information in the kernel TCB or PCB is that the annotation can not be compromised by DUA application activity. In certain embodiments, it is preferred that the annotations are not modified in the ordinary course of events.

In some embodiments where DUA shell implementations automatically propagate the context, the annotation may be done automatically. In other embodiments, such as the embodiment immediately above, new threads, processes, or other activity of the DUA, and those impersonating the DUA, may need to be intercepted and annotated as being in DUA, not OUA, context. In still further embodiments, annotation may involve a combination of automatic annotation and non-automatic annotation.

The DUA may be initialized and maintained based on derivation transformations ("DTs") and derivation rules ("DRs"). Derivation rules are a set of rules that link any aspect of a DUA with the corresponding aspect of its OUA. The derivation rules for a resource, X, include derivation transformations, which are computable functions that take an input, modify the input, and return an output. An argument derivation transformation ("ADT") generally receives an argument as input, modifies the input, and returns a second argument as output, although in some embodiments, the ADT does not modify anything. A result derivation transformation ("RDT") takes as input certain values, modifies the values, and returns modified values. An "update DT" or "UDT" may update the state of a DUA based on its corresponding OUA whereas a "feedback DT" of "FDT" may give feedback from the state of a DUA to the state of its corresponding OUA.

The derivation rules and transformations may be authored by a developer or system administrator. In some embodiments, the derivation rules and transformations may be initially authored by a developer or system administrator but are later modified dynamically. Dynamic rules may be modified during run time according run time dependent conditions or other conditions.

In one embodiment, the derivation rules may take the form of script-like directives. For example, an author of rules may use a text editor or similar device to create a human-readable text file containing the rules. In other embodiments, the rules may be authored in semantic formats such as or similar to known scripting languages or high-level computer languages, or in other formats well know to those skilled in the computer software arts. In still other embodiments, the rules are compiled or otherwise processed by a rule generator into a machine-readable form, which is in turn used by the computer system at run time.

Following is one example of derivation rules consistent with the present invention. The first table comprises an exemplary set of rules for DUA events; the second table comprises an exemplary set of rules for OUA events. Each line in the tables represents a derivation rule which describes the actions that will take place for a particular resource access.

DUA TABLE

| orgname | name1 | name2 | open | read | write | list | format |
|---------|-------|-------|------|------|-------|------|--------|
| /A/B | /OUA/A/B | /DUA/A/B | U:X | U:Z F:T | F:Y | U:V | |
| /R/S | /MASQ/R/S | /DUA/R/S | U:X' | | | | |
| /DEV3 | /DEV/NUL | /DEV/HD1 | | | | | U:K0 A:name1 |

OUA TABLE

| orgname | scrname | destname | open | read | write | list | format |
|---------|---------|----------|------|------|-------|------|--------|
| /A/B | /DUA/A/B | /OUA/A/B | | | F:Y | U:W | |

As shown in the first line of the DUA table above, if an application operating in DUA context refers to /A/B ("orgname"), and the operation is "read", an update derivation transformation, Z, will be performed using /OUA/A/B as the source ("name1") and /DUA/A/B as the destination ("name2"), after which the actual read operation will be In the example above, the update transformation, Z, may also be followed or preceded by a feedback transformation, T, using /DUA/A/B as the source ("name2") and /OUA/A/B as the destination ("name1").

If an application refers to IR/SI and the operation is "open", the UDT, V, will be performed taking /MASQ/R/S as the input and /DUA/R/S as the output, after which the open operation will actually be performed on /DUA/R/S. /MASQ/R/S is data introduced by the DUA mechanism or the rules and, as described below, may be unrelated to the OUA.

In some embodiments, whether or not a DT is specified, the operation is performed on an actual named resource or object, with the rules having as a default one of the names specified in the DUA table above. In this particular example, name2 represents the actual named resource accessed by all operations by default as specified by design. As shown in the third line of the DUA table, in some embodiments, the operation may be performed on name1, as specified, overriding the default case. This last example may be considered one example of an ADT, as the orgname is modified to name2.

Referring now to the OUA table above, if OUA activity refers to IA/B, and the operation is "read," the system will perform a feedback transformation, Y, using /DUA/A/B as input and /OUA/A/B as output before actually performing the read operation on /OUA/A/B.

There are many possible types of derivation transformations, some examples of which are as follows. "Equivalence DTs" may be used to ensure certain parts of the DUA state and the OUA state remain identical. In this case, for example, the state of the DUA may be copied back to the OUA in an feedback DT or the state of the DUA may be refreshed, for example, by an update DT that copies over one or more aspects of the DUA with information from the OUA. Equivalence DTs may be useful in cases where it is desired to have changes in either the DUA or OUA automatically reflected in the other. For example, the system volume control state may need an equivalence DT if volume changes in a DUA are to have the expected effect.

A "copying DT" can ensure that parts of DUA state are copies of the corresponding OUA state, and that any modifications are performed only on the DUA copy. Copying DTs may be used to limit the effects of operations in DUA context upon the information of its OUA. Copying DTs may be useful in situations where a user may wish to evaluate effects of operations on the system without applying them to the OUA. One example of this would be during installation of new software or during debugging of software. If errors occur while operating with a modified DUA, the original OUA is never actually modified. Thus, operations may revert to the original OUA, and the system may be very quickly and easily returned to the old state. In some embodiments, a user may wish to use a copy DT in non-experimental situations where the system is deliberately operated in the DUA context with no intentions of ever modifying the OUA. This may be useful, for example, for security or integrity reasons. In these embodiments, the DUA may be deliberately discarded after the requested action is performed without update to the OUA.

Yet another example of a derivation transformation is a "masquerading DT." Masquerading DTs can specify properties for certain parts of a DUA state, irrespective of the corresponding state of its OUA. Masquerading DTs can be used to perform operations in a DUA where certain states have values unrelated and (perhaps radically) different from that state's values in the OUA. In fact, a masquerading DT may specify that the data for the DUA may be taken from a source other than the OUA. This type of derivation transformation allows operations to be performed in a modified version of the OUA context. Masquerading DTs may be useful in cases of experimentation because the performance of the system using modified state information may be evaluated without modifying the OUA.

A "partitioning DT" ensures that there is no overlap between certain aspects of the DUA and the OUA state, that is, partitioning their namespace or other sets of values. For example, a partitioning DT may assign a new name, Z, to the DUA and rename the resource, X, to be Y, defined as the concatenation of X with Z. Then, the application is allowed to access the resource Y without accessing the original resource X. Partitioning DTs may be necessary when multiple entities, such as the OUA and DUA, or even multiple DUAs, are concurrently sharing resources and each action must have access to, what appears to be, the full capabilities of that resource. One exemplary operation is the simultaneous access of transient or persistent storage by more than one application. Multiple DUAs can concurrently share state—each believing it has fill and exclusive access to that state as long as a partitioning DT creates a new partition of that namespace for each DUA.

A "liveness DT" changes lifetime properties of certain parts of DUA state from those of its OUA, that is, it may make state that is persistent in the OUA transient in the DUA. The OUA may even be purged at regularly timed intervals. Conversely, any other such state meta-information including, for example, access control attributes, may be set to differ using a liveness DT between the DUA and its OUA.

"Dynamic DTs" may be used to specify an arbitrary relationship between a certain state value found in both the DUA and the OUA. For example, in one embodiment consistent with the present invention, a dynamic DT may remove the ability of a DUA to set volume to its maximum value, while still retaining the DUA's ability to perform operations affecting volume—simply, the dynamic DT can set OUA volume value to 90%, if the DUA volume value is set to 90% or higher, otherwise effecting an equivalence DT. Similarly, a dynamic DT can effect the introduction of a named state to the DUA when that state is not found in the OUA, or the removal of a named state from the DUA when that state is found in the OUA. A dynamic DT may implement this, for example, by modifying the behavior of all state namespace enumeration operations—and with the assistance of a partitioning DT, either account can create or remove such (introduced or removed) state independently.

Derivation transformations may also specify that if an original state value is within a range [A,B] specified by the derivation rule, than the corresponding state value in the DUA is the original state value of the OUA. If not, the state value of the DUA becomes either A or B, whichever is closer to the original state value. This update derivation transformation may be referred to as a "Bounded value" DT. Feedback may also be bounded in a similar manner. In a feedback bounded value DT, for example, if a state value of the DUA is within a range [A,B] specified by the derivation rule, the OUA will get the state value of the DUA. Otherwise, the OUA will receive whichever of A or B is closer to the state value of the DUA.

Still other examples of derivation transformations consistent with the present invention operate on metadata. For example, it may be desired to initially provide access to all information in a data or file, but when copying is performed, it is desired to limit copying to the contents and not copy the metadata, such as access control permissions, time stamps, and name of the file. The derivation rule may block the copying of the metadata but may provide different information in its place, that is, some or all of the metadata may be masked.

An "enumeration" transformation excludes or adds information to a list. An "enumeration" transformation is a variety of a masquerading transformation in the sense that it masks the real information by adding members to the real list or deleting actual members from the real list before allowing access to the list.

One skilled in the art will recognize that there exist many possible derivation transformations and derivation rules. The list above is only exemplary and not meant to comprise the universe of allowable derivation transformations and rules.

Referring back to FIG. 2, once a DUA is created, the application is executed using the DUA, not the original user account. If, for example, the DUA is a new user account, as described above, the application may be redirected to the DUA. If, in another example, the DUA is a token, as is also described above, the application may execute based on permissions in the DUA token. In still another example, the arguments of the application may be modified in accordance with the DUA so that the original application may execute on the modified arguments. The method continues from step 230.

If the application is already operating in DUA context (step 220), the application is executed using the DUA (step 230). The system determines whether the resource sought by the application relates only to a specific user account (that is, a "local" resource) or is information that is shared between multiple user accounts (step 235). If the resource is shared, or "global," the DUA contains derived global system state ("DGSS") information and derivation transformation rules that update or feedback to more than one user account.

In either case, the system determines the type of access requested (steps 240 and 260). Additionally, the DUA or DGSS may optionally be updated by information from the OUA based on the applicable derivation rule before the requested activity is performed (steps 242 and 262). These actions help ensure that the system will have access to the most current information in the OUA. After the DUA or DGSS are updated (steps 242 and 262), the requested activity is performed by reading the DUA or DGSS (steps 244 and 264). Depending on the type of access requested and the derivation transformation rules, the system may optionally communicate changes to the DUA or DGSS back to the OUA in a feedback transformation, if such feedback is indicated (steps 244 and 264).

In each case, after the application performs the requested activity, the system is returned to normal operations (step 280).

Figure 3:
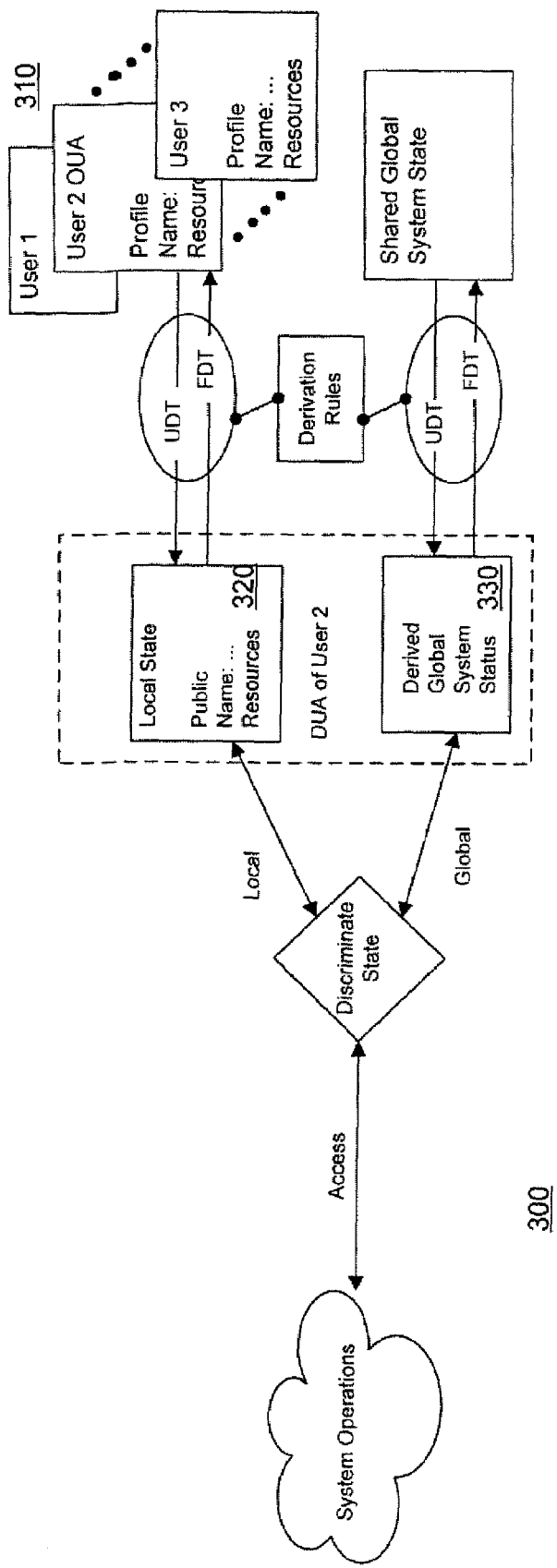
FIG. 3 is block diagram of a system 300 for performing operations accessing state of a derived user account in a multi-user system consistent with the present invention.

FIG. 3 is block diagram of a system 300 for performing operations accessing state of a derived user account in a multi-user system consistent with the present invention. FIG. 3 illustrates the components in a DUA-enabled system consistent with the present invention. As shown in FIG. 3, during operation of an operating system, a application 310 requests access to a system state. Consistent with the principles of the present invention, the system discriminates whether the system is requesting access to local state information 320 of a user account or derived global system state information 330 and directs the requesting application to the appropriate state information of the DUA. As shown in FIG. 3, the DUA state information may be updated based on the corresponding state information of the corresponding OUA and update derivation transformations (UDTs) based on the derivation rules. The DUA may feedback state information to the corresponding OUA based on a feedback transformation (FDT) and the derivation rules. The derived global system state information 330 may be similarly updated based on UDTs and may feed back information to the original shared global system state based on FDTs.

The above represents one exemplary embodiment of the present invention. In some embodiments, DUA events can also occur even though no access is being made to the DUA or OUA resources. In particular, DUA events may occur on a resource X at a specific time, or at specific timed intervals, or given the satisfaction of an arbitrary predicate on the system state or the system environment.

Exemplary System Architecture

Figure 4:
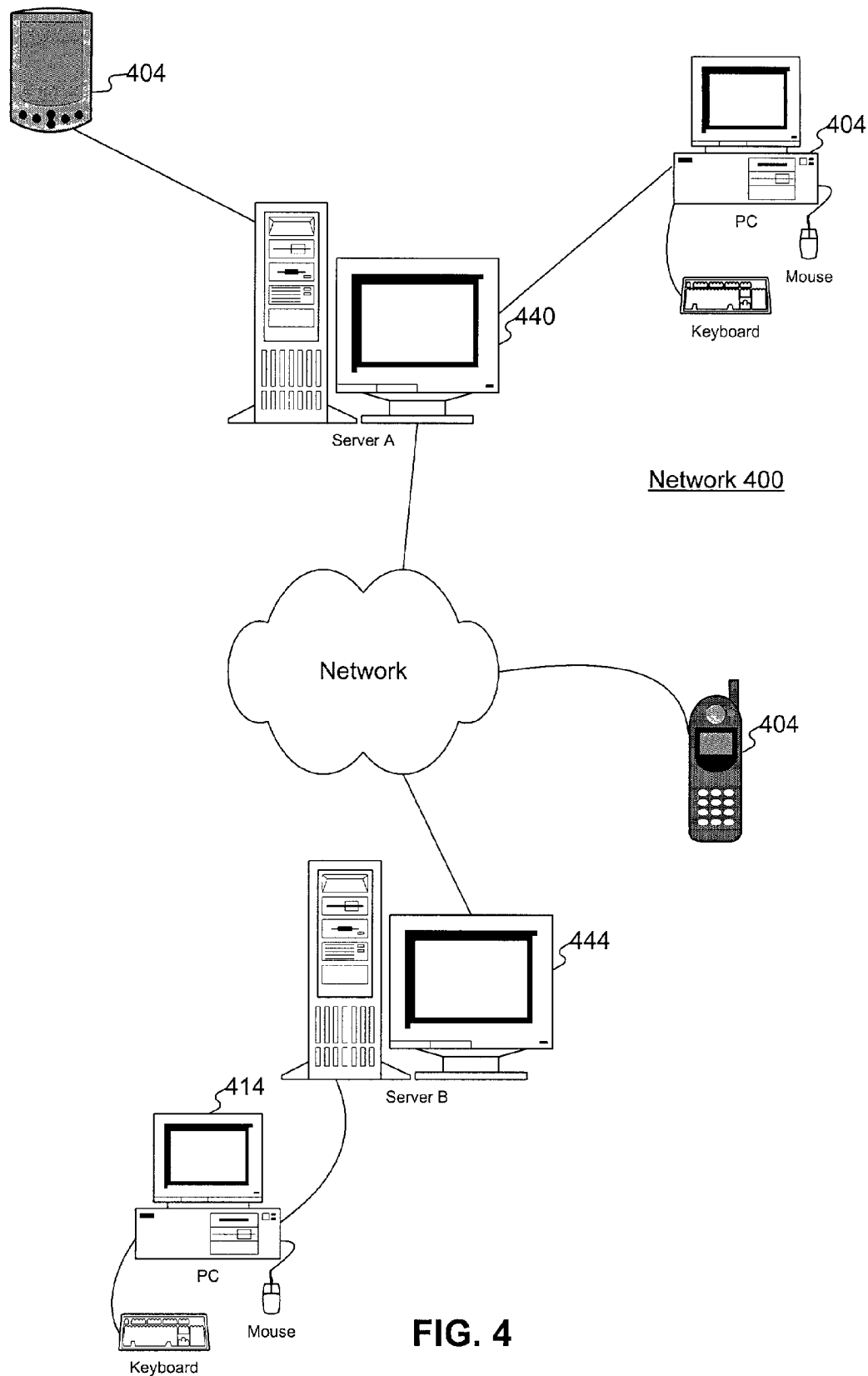
FIG. 4 illustrates one embodiment of a system consistent with the present invention.

FIG. 4 illustrates one embodiment of a system consistent with the present invention. In fact, any conventional computer system supporting the abstraction of user accounts may be programmed to support the principles of the present invention. The system in FIG. 4 represents a computer network 400 that comprises one or more client computers 404 and 414 and one or more servers 440 and 444. In this specification, the terms "client" and "server" are used to refer to a computer's general role as a requester of data (client) or provider of data (server), however each computer may request data in one transaction and provide data in another transaction, thus changing the computer's role from client to server. Client 404 may also be a thin client, which is generally understood to be a network computer without a hard disk drive. Client 404 may also be a personal digital assistant ("PDA"), such as a PalmPilot, a cellular phone, or other computerized device. As shown in FIG. 4, client 404 may be connected to one or more servers by a suitable bus or wireless connection.

In some embodiments, a software application operating on client 404 may place a request that involves data stored on or instructions that are executed on Server A 440. Since client 404 is directly connected to Server A 440, for example, through a local area network, this request would not normally result in a transfer of data or instructions over what is shown as "network" of FIG. 4. The "network" of FIG. 4 represents, for example, the Internet, which is an interconnection of networks. A different request may involve data or instructions stored on Server B 444. In this case, the data may be transferred from Server B 444 through the network to Server A 440 and, finally, to computer 402. The distance between Server A 440 and Server B 444 may be very long, e.g. across states, or very short, e.g., a few inches. Further, in traversing the network the data may be transferred through several intermediate servers and many routing devices, such as bridges and routers.

Figure 5:
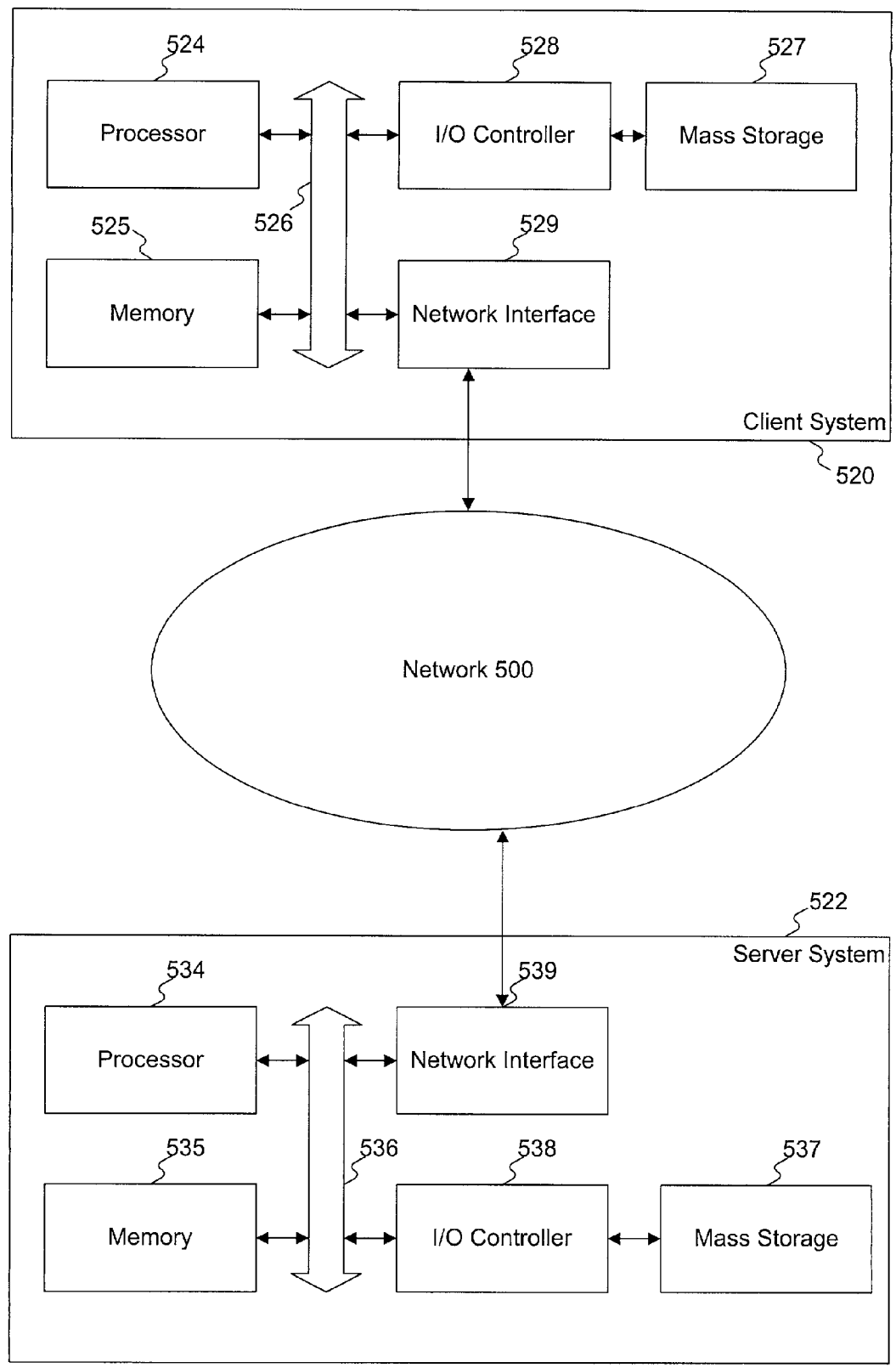
FIG. 5 shows, in more detail, an example of a client-server system interconnected through network 100.

FIG. 5 shows, in more detail, an example of a client-server system interconnected through network 500. In this example, a server system 522 is interconnected through network 500 to client system 520. Client system 520 includes conventional components such as a processor 524, memory 525 (e.g. RAM), a bus 526 which couples processor 524 and memory 525, a mass storage device 527 (e.g. a magnetic hard disk or an optical storage disk) coupled to processor 524 and memory 525 through an I/O controller 528 and a network interface 529, such as a conventional modem.

Server system 522 also includes conventional components such as a processor 534, memory 535 (e.g. RAM), a bus 536 which couples processor 534 and memory 535, a mass storage device 537 (e.g. a magnetic or optical disk) coupled to processor 534 and memory 535 through an I/O controller 538 and a network interface 539, such as a conventional modem. It will be appreciated from the description below that the present invention may be implemented in software which is stored as executable instructions on a computer readable medium on the client and server systems, such as mass storage devices 527 and 537 respectively, or in memories 525 and 535 respectively. Rules or derivation transformations may be stored in, for example, memory 525 or mass storage 527 on client system 520 or memory 535 or mass storage 537 on server system 522.

Processors 524 and 534 may be microprocessors such as the Pentium® family microprocessors manufactured by Intel Corporation. However, any other suitable microprocessor, micro-, mini-, or mainframe computer, may be used. Memories 525 and 535 may include a random access memory (RAM), a read-only memory (ROM), a video memory, or mass storage. Mass storage 527 and 537 may include both fixed and removable media (e.g., magnetic, optical, or magnetic optical storage systems or other available mass storage technology). Memories 525 and 535 may contain a program, such as an operating system, an application programming interface (API), and other instructions for performing the methods consistent with the invention.

Figure 6:
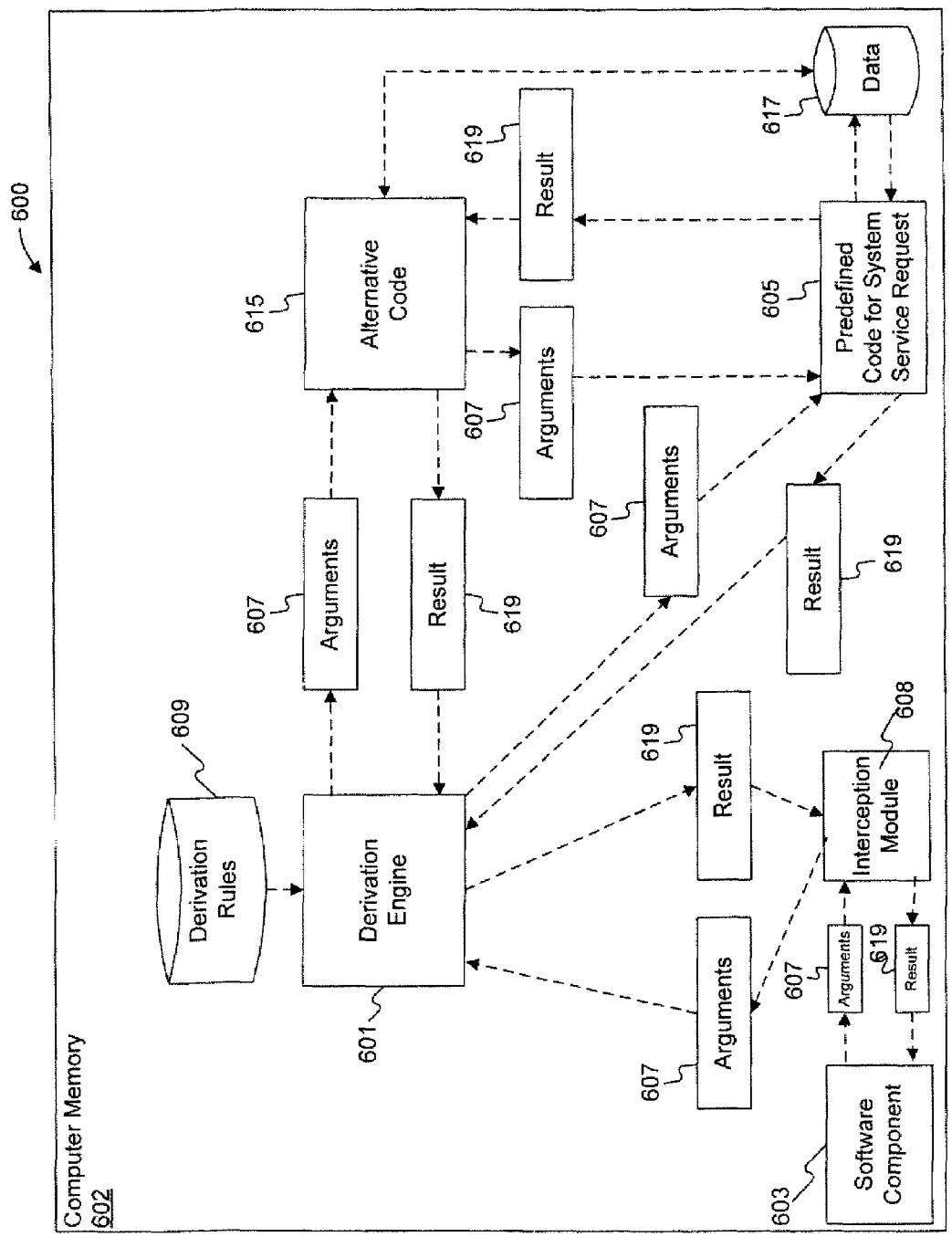
FIG. 6 is a block diagram illustrating one exemplary embodiment of a system using DUAs consistent with the present invention.

Derived user accounts also may be generated and used in a system, such as that described in commonly assigned, co-pending application Ser. No. 10/082,591, filed Feb. 22, 2002, entitled "Altered States of Software Component Behavior," which is expressly incorporated herein by reference in its entirety. FIG. 6 illustrates one such exemplary system 600. As shown in FIG. 6, a software component 603, executing in computer memory 602 may request access to a resource, X. The request may comprise arguments 607, such as a source name or a destination name, and a requested action, such as, for example, open, read, write, list, or format. In one embodiment consistent with the present invention, the request may be intercepted by interception module 608, which may be understood as software code residing between predefined code 605 and the actual software code that is executed in response to the request. Interception module 608 captures the request, including arguments 607, and passes the request and arguments to derivation engine 601 which, as described below, manages the actual calling of code in response to the request.

Techniques for intercepting the request are well known to those of ordinary skill in the software arts. For example, interception of a hardware or software supported system call may comprise redirection of an interrupt service vector to alternative code. For library-based services, interception can take the form of the modification of dynamically-linked libraries (prior to loading or at link time, as desired). For any subroutine or function-based service, redirection of the subroutine call instruction, or machine-code patching of subroutine entry code can be employed. Any service dispatch mechanism based on dynamic name-resolution can be intercepted by a change in the service-lookup namespace.

In other embodiments consistent with the present invention, derivation engine 601 receives a request directly from software component 603. For example, software component 603 may call the derivation engine 601 or derivation engine 601 itself captures software component 603.

Once the request is received by derivation engine 601, either directly or indirectly, derivation engine 601 may consult derivation rules 609, which may be dynamic or static, for assistance in processing the request in accordance with the present invention. Derivation rules 609 comprise derivation transformations, as described above. Based on the derivation rules 609, derivation engine 601 determines how to direct access to a derived user account. For example, if the request specifies to write data to a location A specified by the request, in the DUA context, the arguments 607 of the request may be modified by derivation engine 601 in accordance with derivation rules 609. In one exemplary embodiment, as described with reference to the DUA table shown above, if a request (which in this example is an application) requests that a read operation be performed on original name "/A/B," and the appropriate derivation rule comprises the derivation transformation, Z, which specifies that read operations on /OUA/A/B should instead be performed on /DUA/A/B, the arguments of the request may be modified so that /DUA/A/B is the source of the data for the read operation.

Once derivation engine 601 modifies arguments 607 in accordance with the derivation rules, derivation engine 601 may pass arguments 607 to predefined code 605 or alternative code 615. In addition, alternative code 615 may invoke predefined code 605 at some point during its execution. In some embodiments, alternative code 615 may modify data 617 or dynamic derivation rules 609. A result 619 may be returned from execution of predefined code 605 or alternative code 615 to derivation engine 601. Derivation engine 601, in turn, returns result 619 to software component 603.

Secure Application Environment

Methods and systems consistent with the present invention may be used to create a secure application environment ("SAE"). An SAE consistent with the present invention may be established by using DTs to create a DUA that isolates actors in a DUA from a corresponding OUA. In certain embodiments consistent with the present invention, an SAE is created by selecting for each resource whose access is controlled by the OUA a DT that provides security for that resource without, whenever possible, reducing functionality of the system as a whole, and creating a means for accessing a version of each resource based on the selected DT that may be accessed by an insecure actor.

One simple example of an SAE consistent with the present invention is one that uses a copying DT to create a DUA that represents a copy of all resources in the OUA. Such a transformation provides excellent isolation and data integrity because all operations in the DUA affect only copies of resources, not the actual resources themselves. However, a DUA based solely on copying DTs may not provide adequate privacy if, for example, all data from the OUA is copied and available in the DUA. A copying DT-only DUA would also be expensive in terms of resources and time, since it would likely require double the resources of the OUA to create a DUA where everything is copied, and it may take a relatively long time to copy everything, including things the isolated actor might not use.

Another example of an SAE consistent with the present invention is one that simply blocks access to resources outside of the scope of the OUA. For example, in an operating system where every user window has a global identifier, it may be undesirable to allow arbitrary, untrusted actors to be able to perform operations using these identifiers since the window might actually be a resource created by another process.

In certain embodiments of methods and systems, an SAE consistent with the present invention involves a combination of DTs and other methods so as to create a secure environment. For example, the copying or blocking methods described above may be used alone or in combination with a masquerading DT that masks any information that should be kept secret. As described above, when a DUA is created using a masquerading DT, certain values of the OUA may be altered or masked to prevent the actual values from being made known. For example, an operating system registry that contains user profile information might include items such as a user's real name. When this registry is accessed in an SAE consistent with one embodiment of the present invention, a masquerading DT could substitute false data for the user's real name in the copy of the registry that is created in the DUA.

Figure 7:
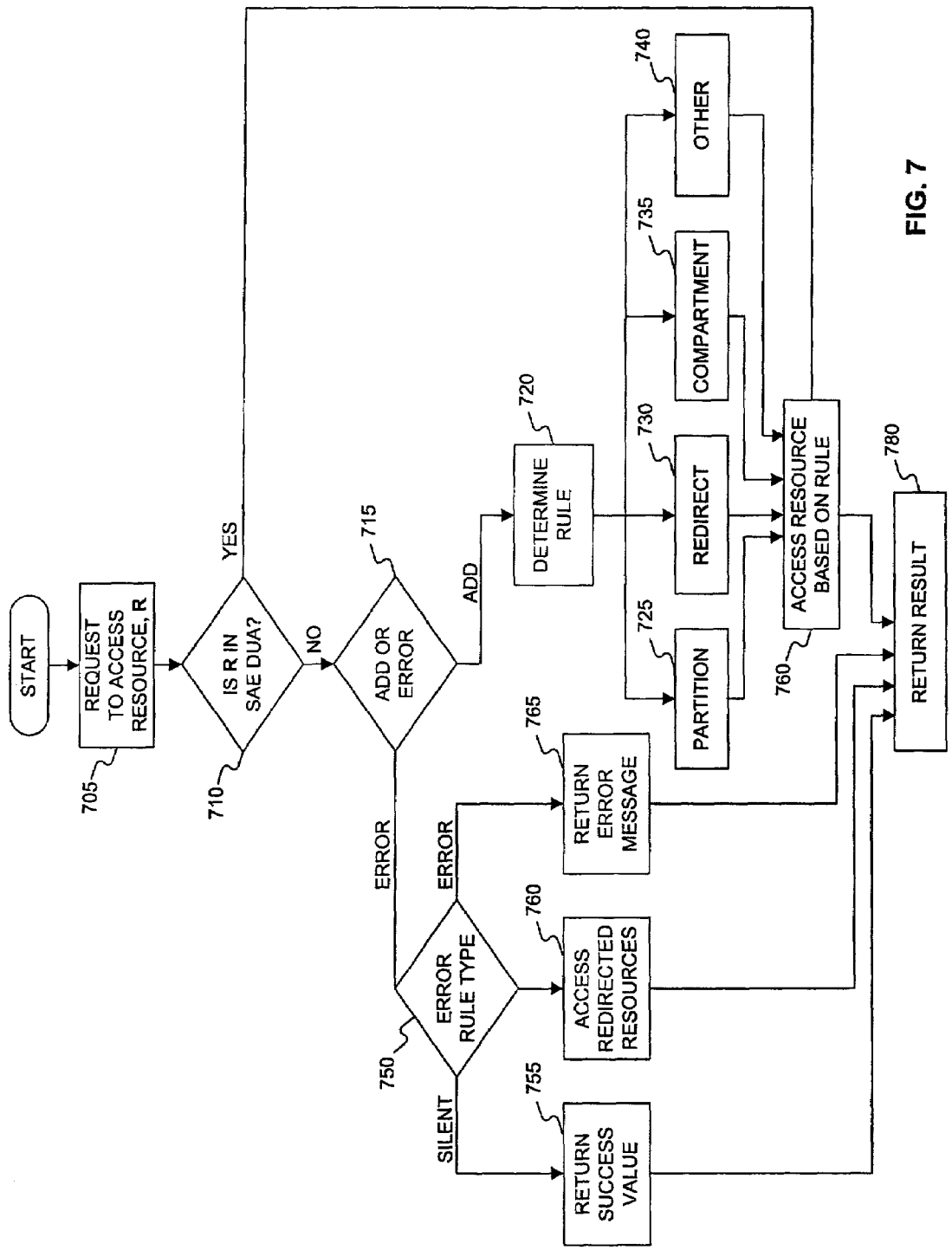
FIG. 7 is a flow chart illustrating one exemplary method of accessing a resource in a secure application environment consistent with the present invention.

FIG. 7 is a flow chart illustrating one exemplary method of accessing a resource in a secure application environment consistent with the present invention. In step 705, a request to access a resource R is received. The request may comprise a resource and type of access it is requesting (such as read, write, delete, create or others). A "resource" may be, for example, state information, such as data that lies in memory, file systems, registry configurations, other applications, processes, network ports, semaphores, window handles in graphical user interface ("GUI") systems, hardware devices such as a soundcard or printer, or other named abstractions. In a system consistent with the present invention, all requests may be directed to, intercepted by, or received by an intermediate software component, such as interception module 608 in FIG. 6.

It is then determined if the requested resource R exists in the DUA for the SAE (step 710). This may be accomplished by, for example, determining whether there one or more derivation rules in a DUA table, such as the one shown above following paragraph 35, associated with resource R. If resource R exists in the SAE DUA, the requested resource is accessed in accordance with the derivation rule or rules specified in the SAE DUA (step 760) and the result is returned (step 780).

The DUA table mentioned above may be created prior to execution of the SAE or dynamically during execution of the SAE. By dynamically creating these resources only when needed, an SAE may conserve resources and minimize the time required to create the safe environment. Creating resources in the DUA dynamically also allows different DTs to be used to derive a resource based on changing contexts. For example, it is possible to grant permission to "open" a file resource if the request comes from a user-initiated context (such as a dialog box) but deny the permission if there is no user interaction context (a simple call to "open" from within a program).

If, however, resource R does not exist in the SAE DUA (step 710), it is determined whether to add the requested resource to the SAE DUA or to block access to the requested resource and return an error (step 715). If it is determined that the resource should be added to the SAE DUA, methods consistent with the present invention determine a derivation rule for the requested resource based on the type of access requested (step 720). In certain embodiments consistent with the present invention, the derivation rule is chosen so as to maximize security. In certain other embodiments, the derivation rule is chosen so as to maximize security without loss of certain functionality.

In certain embodiments of an SAE consistent with the present invention, security is enhanced by a derivation transformation that partitions the namespace of the resources in such a way that actors in the SAE have apparent, but not actual, access to the actual resources (step 725). For example, in certain embodiments consistent with the present invention, the SAE may partition the namespace for resources and restrict the DUA to use only that part of the namespace that has been isolated for its use. Namespaces may be "partitioned," for example, by "rerooting" a hierarchical namespace or "tagging" in a non-hierarchical or "flat" namespace.

A hierarchical namespace is a namespace that is organized in the shape of a pyramid, with each row of names linked to objects directly beneath it, such as a file system having directories and subdirectories beneath them. Resources in a hierarchical namespace, such as files in a file system or Microsoft Windows registry entries, can be partitioned by "rerooting." In rerooting, resources in the namespace that are required in the SAE can be copied from their original path (relative to the absolute root in the hierarchy) to a similar path location relative to the subset root. For example, the SAE can create a node in the file system called /SAE_ROOT. If the DUA requires access to files in /user/home, these files can be copied to /SAE_ROOT/user/home. Then all file requests from inside the SAE can be mediated by a rule that prepends /SAE_ROOT to the actual name requested. In certain embodiments consistent with the present invention, to preserve system integrity, the node representing the root in the SAE must be a barrier, that is, actors inside the SAE must only be able to see or modify the namespace below the virtual root, and actors outside the SAE must not be able to see or modify the file system below the virtual root (with the exception of the derivation engine, which can access the entire namespace).

If a namespace is not hierarchical, or "flat", logical partitions can be created by "tagging." Tagging involves, for example, assigning a unique tag to names of resources available within the DUA. One example of a resource that may be accessible using tagging is a semaphore. SAEs consistent with the present invention may, for example, append a unique, x-bit number to any semaphore name that it creates, effectively partitioning the namespace. When an actor accesses a semaphore from within the SAE, access can be granted only if the requested id contains the unique identifier. Different unique identifiers allow multiple SAEs to co-exist, each using a separate and unique subset of the namespace, and there should be no overlap between the semaphores used by processes inside and outside of the DUA (nor even among semaphores in use in different DUAs). Tagging schemes should be chosen such that the uniqueness of tags can be guaranteed sufficiently. For example, choosing a random value from among all 128-bit numbers has little chance of being the same as a value already in use by another SAE. In some cases, such as the globally unique identifier ("GUID") mechanism in the Windows 2000 operating system, facilities already exist in the system for allocating unique ids.

For other resources and access types, the appropriate derivation rule may include a derivation transformation that performs redirection (step 730). Redirection means redirecting a request to an equivalent resource with another name. Redirection may be the most appropriate action for some resources (such as shared memory, ports, and some hardware devices). In these cases, if an actor, such as a process within a DUA shell, attempts to modify resources in the SAE that it should not modify, the actor may be redirected to another resource that appears to be the intended target within the SAE, but which is actually some other resource. For example, an attempt to connect to a reserved, global network port (such as 25) could be redirected to an arbitrary number (such as 9925) that is not in use by other system processes. This way, the process inside the DUA shell is prevented from interfering with activity on port 25 in the actual environment, but should be able to function as expected. The derivation engine may maintain a record (such as a table or list) of associations between a name used in a DUA shell and the name of an equivalent resource that is not in use.

Still other resources may be secured by using a derivation transformation that performs compartmentalization (step 735). In some namespaces, the SAE handles resources by compartmentalizing the namespace and maintaining a record of which compartment any particular resource belongs to. For example, an SAE consistent with the present invention may maintain a table of resource names that are only valid within the DUA. If a resource exists in the table, the resource falls within the DUA compartment and, if not, falls within the non-DUA compartment. The SAE then mediates access to resources in the system by intercepting calls from the SAE, as well as calls from outside the SAE, and determining whether to allow the access based on the list. If a resource is not on a list of resources within the SAE, the SAE may treat the resource as "nonexistent" in the SAE. For example, if a process inside the SAE creates a user interface window with an id of 4000, then attempts by processes outside of the SAE to send or receive events in that window will fail. A derivation engine can modify the call to indicate that the window id is not usable, does not exist, or that access is denied.

For still further resources, the derivation rule may involve other DTs, such as any described above, or other DTs known to those skilled in the software arts, or a combination of more than one DT (step 740). For example, there may be information in the OUA that should be kept secret or private and not copied to the DUA. Some examples of such information include user application preferences, user-defined security policies, and security credentials. Other examples include information that relates the OUA to an actual individual or group such as, for example, real names, address books with email addresses, and other contact information. The OUA may also include information that should be regulated based on some real identity of the user (normally enforced by the OUA identity) and this real identity cannot be programmatically separated from a DUA based on the OUA. For example, a spreadsheet contains data that a user might use in his or her job, but which should not be revealed to an anonymous actor.

Certain embodiments of the present invention distinguish private content data from the contents of files like the executable file that run the spreadsheet application by use of DTs that provide apparent access to all OUA resources without disclosing private data. Examples of such DTs include masquerading DTs and dynamic DTs.

As is also described above, masquerading DTs create objects in the DUA using anonymous or falsified data. An object created using a masquerading DT appears to be the real thing (an address, a real name, etc), but the data it contains is not actually from the OUA. For example, in the SAE, an actor may be able to open the user's address book, but it will only find falsified names (or no names at all). Thus, activities in the SAE can operate without restriction (all of the requested resources are available for use), but the outcome of operating on private data resources might be different to keep that data secret.

There may be some set of resources in the OUA that should be kept secret from activities in the DUA, but which cannot be masqueraded. Certain embodiments of the present invention may employ context-sensitive dynamic DTs to control access to these resources. A derivation engine can use the context of activity in the DUA and dynamic DTs together to determine how to regulate access to these resources. For example, an enumeration DT might specify that only spreadsheet files from a certain directory are accessible in the DUA; otherwise the files "do not exist" in the DUA. The fact that some specific spreadsheet files do not exist does not change the functionality available in the DUA, but at the cost of creating specific derivation rules for different privacy contexts. Other solutions could protect privacy using more programmatic rules, but may result in differences between the OUA and the DUA that may limit the usefulness of the DUA. For example, preventing access to any spreadsheet file, preventing the spreadsheet application itself from running, or using a different effective user id to determine access rights are examples of solutions that may dramatically change the behavior of actors in the SAE.

Returning now to FIG. 7, after one or more derivation rules for the requested resource is created based on steps 725, 730, 735, or 740, the requested resource is access based on the derivation rules in step 760 and the result returned (step 780).

If it is determined to block access to the requested resource and return an error (step 715), methods consistent with the present invention determine an error rule type (step 750). For example, in certain embodiments, if an actor attempts to modify resources in an SAE that it should not modify, the call may fall silently, that is, the call may appear to have been successfully completed, but it actually has not performed any access (step 755). This option may allow an actor to continue to do work, even though some action it believes has succeeded—such as formatting disk sectors— did not actually complete. The drawback to this approach is that the actor might rely later on the assumption that the call was completed (e.g., that a disk is formatted). This drawback potentially affects the usability of the system, but not its security.

In certain embodiments of the present invention, if an actor attempts to modify resources in an SAE that it should not modify, the call may be prevented from completing and the actor will be notified of the unsuccessful completion with an error message (step 765). In some cases, this may be the appropriate behavior (for example, if the attempted access would also fail for an actor in the OUA).

In still other embodiments, the access may be redirected to another resource (step 760. In all of the cases above, a result or error message is returned (step 780).

An SAE consistent with the present invention is able to intercept calls that access global system resources, apply a set of rules based on the context of the call, and then modify the call using the appropriate DT, as is shown in FIG. 6. The appropriate DT may be a transformation that modifies the call, redirects the call to some other resource, modifies the data returned by the call, or some combination of all of these. One certain embodiment of an SAE consistent with the present invention is based on a DUA that has access to copies of resources in the OUA that can be copied, but cannot modify or receive information from OUA resources that cannot be copied. In essence, the SAE is isolated within a boundary across which no information can flow. Inside the SAE boundary, access to resources is granted only if an isolated copy of the resource can be made available by an appropriate Update DT (UDT). At the most basic level, creating the SAE involves creating a DUA shell and a derivation engine, such as derivation engine 601 shown in FIG. 6.

In certain embodiments of an SAE consistent with the present invention, a DUA shell satisfies the following requirements: 1) all resource requests from within the DUA shell (any operations across the DUA shell boundary) must be mediated, therefore everything that acts on a resource outside of the DUA must be visible to the derivation engine; 2) the DUA shell boundary cannot be circumvented, that is, actors in the SAE cannot access anything outside of the SAE except by going through the derivation engine; and 3) the derivation engine cannot be subverted because the mediation and derivation engine code runs outside of the SAE and the previous condition is satisfied.

In certain embodiments consistent with the present invention, an SAE using DUAs may wish to impose limits on resource usage by activity within the DUA, so that an actor cannot interfere with the OUA by consuming all of the free memory, disk space, network ports, file handles, or other system resources. One method for doing so is to have a DUA shell impose quotas on the resources, and deny further activity using new resources when the quota is reached.

In certain embodiments, the usability of an SAE using DUAs can be enhanced by allowing direct access to certain information in the OUA. Providing access to information in the OUA minimizes the divergence between the OUA and the DUA. For example, if a user uses an application running in the SAE to "bookmark" a web site, the bookmark could be added to the bookmarks list in the OUA so that it is available to any application (inside or outside of the SAE). Such access, of course, has the potential to affect the integrity of the OUA. The derivation rules that allow this access must be constructed carefully to minimize the impact on system integrity and, in certain embodiments, may allow only DTs that can be structured to recognize and maintain the integrity of the OUA to modify data in the OUA. In the example where users are allowed to add bookmarks from the DUA, it must be possible to assert that the data to add to the list meets well-defined criteria such as "each entry contains only ASCII data, begins with the length of the entry, and does not contain special characters." Such DTs may need to be constructed on a case-by-case basis to meet the needs of every special context where access to OUA data is allowed.

In certain other embodiments consistent with the present invention, more than one DUA may be created. For example, a first or "regular" DUA may be generated based on the OUA. A second DUA (or SAE DUA) may then be generated based on the regular DUA. The regular DUA operates as an intermediate DUA that precludes access to SAE DUA data. It therefore follows that this system may be similarly extended so that multiple layers of DUAs are created.

Certain embodiments consistent with the present invention may be implemented using a Windows 2000 platform. In a certain exemplary embodiment using Windows 2000, an SAE DUA can be created by modifying the behavior of all system calls to the operating system in the kernel, or protected-mode, part of the system. In Windows 2000, this behavior modification can be accomplished by changing the pointer to the system-call dispatch table in the thread control block of all threads performing DUA activity. The ADTs and RDTs are changes to the system call arguments and results. The UDTs and FDTs are pre- and post-processing functions that can leverage any information about the system call. Finally, for certain system calls that are not to be supported by the SAE DUA (e.g., in Windows, Mailslots and Debug-Ports) the system calls can immediately return an error indicating that this system call is not implemented. Because the SAE DUA mechanism is in the protected-mode part of the system, activity in the SAE DUA cannot modify or subvert the state of the SAE DUA, nor can it circumvent the SAE DUA to use the original system calls.

The SAE DUA mechanism intercepts, via the system calls, all references to named resources. The SAE DUA can arbitrate the naming of many resources, prohibiting DUA activity from accessing names in certain parts of the hierarchy. The SAE DUA mechanism may, for example, determine a single, canonical name for a resource in order to apply policies consistently. For example, it must resolve all symbolic links to determine the resource actually named, and it must preclude hard links with inherent ambiguity. This means the SAE DUA can rely on the integrity of resources normally accessible to non-protected-mode activity.

The modified pointer to the system-call dispatch table can constitute an SAE DUA shell if it is properly propagated to all new processes, threads, and impersonations. A new, restricted user-token and/or job may also be used as a DUA shell. Other methods may also be used provided that the DUA shell created propagates the DUA context to new threads and processes, and also to threads that impersonate the DUA. In cases where the propagation of DUA shell context to impersonation does not happen automatically, such as in Windows 2000, the semantics of impersonation may be modified to propagate DUA context.

In certain embodiments consistent with the present invention, system activity can be restricted by using a restricted token for the DUA shell instead of by intercepting system calls. Windows 2000 provides built-in mechanisms for preventing a restricted token from performing activities such as rebooting the machine, installing drivers, and other activities.

Some abstractions, such as unnamed kernel abstractions, are local to a process address space and contained within the DUA. For inter-process communication, the SAE DUA accesses these abstractions in a namespace that separates SAE DUA names from names not in the SAE DUA context. Examples of named operating system abstractions for inter-process communication include, but are not limited to, channels, events, event pairs, IOcompletion ports, mutants, mutexes, pipes, ports, sections, semaphores, shared memory segments, timers, and waitable ports.

In the Windows 2000 example, the SAE DUA can use globally unique identifiers (GUIDs) to create unique namespaces for these names in the SAE DUA. In addition, since Windows 2000 objects are accessed in a hierarchical namespace, a GUID can be used to name a unique folder under /BaseNamedObjects, such as /BaseNamedObjects/<GUID>/. Then all objects used in the SAE DUA can be copied from a path relative to /BaseNamedObjects to the same path relative to /BaseNamedObjects/<GUID>/.

In Windows 2000, tagging may be used for flat (non-hierarchical) namespaces. A GUID may be concatenated to the names of copied objects when they are created. When the tagged object is accessed by its base name from within the SAE DUA, the GUID can be added. When the object name is extracted from a handle in the SAE DUA, the GUID can be removed from the name. In certain embodiments consistent with the present invention, activities in the SAE DUA operate on names without the GUID, but the operations may be mapped to the copy of the object with the GUID in its name.

In both cases, the SAE DUA may be restricted to refer only to objects identified by the GUID. The derivation engine transforms references to /BaseNamedObject/x to /BaseNamedObject/<GUID>/x (in a hierarchical namespace) or references to /BaseNamedObject/x/y/z to /BaseNamedObject/x/y/z<GUID>(in a flat namespace). In addition, in the Windows 2000 example, the SAE DUA may be restricted to refer only to objects in /BaseNamedObject.

In certain embodiments where more than one DUA is created, a regular DUA may make sure activity outside of the SAE DUA does not use objects in the SAE DUA sub-namespace by, for example, precluding those activities from using the unique identifier (such as a GUID) anywhere in the name (assuming the identifier is "sufficiently unique" so that it should not occur by chance in a randomly chosen object name).

In Windows 2000, window handles exist in a global flat namespace of system-assigned numeric names. In some embodiments consistent with the present invention, activities in the SAE DUA must be prevented from arbitrarily accessing and creating window handles outside of the DUA. This may be accomplished by, for example, using a table to create an artificial partition. Window handles that are valid in the SAE DUA are entered into the table. All system calls that use window handles are intercepted. From inside the SAE DUA, a call that uses a window handle that is not in the table is refused (an appropriate error, such as "invalid argument" is returned).

In the Windows 2000 example, if the DUA shell implementation uses a job, it can use the built-in restrictions on jobs to regulate access to window handles. However, these restrictions also prevent the association of mouse pointers with certain windows, so mouse pointer-window interaction may need to be handled and regulated separately.

For usability, the DUA shell can make some well-known windows (such as a the desktop window) available in the SAE DUA window handle table. This can be done by, for example, putting the actual window handle in the table of valid SAE DUA window handles. Actors in the SAE DUA can now send messages and control the window. In another embodiment consistent with the present invention, windows are made available by creating a substitute window that has similar properties and putting a handle for the substitute window in the SAE DUA window handles table. Using this method, a simulated desktop window may be able to display a "full-screen" application in its entire extent, but it is still a floating window and not the actual desktop itself.

Certain embodiments of the present invention handle activities that use more than one window handle and at least one of the window handles is in the SAE window table and at least one of the window handles is not. For example, in Windows NT, the Dynamic Data Exchange (DDE) facility uses window handles on both sides of a communication connection. Certain embodiments of the present invention may handle this condition by, for example, putting the "other" window handle into the SAE DUA window handle table. Alternatively, certain embodiments of the present invention put a proxy window handle into the SAE DUA window handle table. The proxy window handle references an object controlled by the SAE DUA that can receive messages and events, intercept and possibly modify them, and then forwards them to the recipient. In certain other embodiments of the present invention, the window handles table may contain temporary entries or the handle to a proxy window that forwards certain messages over to the actual window underneath it and forwards replies back to the application in the SAE DUA.

In certain embodiments involving more than one DUA, named abstractions of this type created by the SAE DUA may need to be hidden from the regular DUA. Exposing these window class names or atoms may allow communication from the SAE to control the regular DUA in some manner. However, for some brief periods, such as for the duration of a well-known DDE operation, the SAE DUA names may be exposed to the regular DUA to allow correct functionality.

Kernel abstractions for representing activities in the system include, for example, jobs, processes, process groups and threads. Processes and threads typically use a numeric identifier from a flat namespace (in which case that namespace may be partitioned by, for example, using a window handle table). Jobs and process groups are typically named, and can be partitioned, for example, by using a unique sub-tree in a hierarchy or GUID name suffix to make sure the SAE DUA can only use its own Jobs or Process Groups. These abstractions do not have to be hidden from regular activity, as it is unlikely their exposure will cause subversion of the regular activity.

Some named Windows 2000 kernel abstractions are associated with a particular OUA running on a particular machine; that is, there is a set of session kernel abstractions related to each OUA session. These session kernel abstractions include, for example, user token, session, WindowStation, desktop, and profile. A single instance of each session kernel abstraction provides a fully functional execution environment for any software a regular user is likely to use. The SAE DUA does not need to generate new session states. The SAE DUA can use the session kernel abstractions created for the OUA session that contains the SAE DUA.

In certain embodiments, the SAE DUA must not be able to delete, inappropriately modify, or otherwise subvert session kernel abstractions. Silently ignoring or failing any such operations or any operations that create new resources of this type should not affect in any way the behavior of regular applications. Creating and modifying session kernel abstractions may be restricted to trusted actors with special privileges or possibly not even allowed in the OUA. Most non-malicious actors will perform its tasks within the session where it runs. Trusted actors that have special session requirements or need to modify the session typically require special permissions, enter the system via carefully monitored and configured installation procedures, or are run by users for the purpose of achieving some result that cannot be achieved by typical application software. Therefore, an untrusted actor that request to modify session abstractions is likely a malicious actor trying to modify the user's environment surreptitiously.

Some Windows 2000 hardware-related abstractions need to be exposed in a limited fashion to the SAE DUA. These abstractions include, for example, devices, adapters, callbacks, controllers, and drivers. Only limited subsets of the resources in these abstractions need to be exposed to the SAE DUA. In certain embodiments, the SAE DUA prevents everything except standard access to a commonly-used set of devices, which may be periodically modified, unless the actor is specially identified as one having special device needs. An example of non-standard access to a commonly-used device would be formatting or re-initializing hard-disks or other stable storage devices. Although these devices may be common, the particular operation of formatting is used infrequently and only in certain exceptional ways and circumstances.

Many of these devices (where a device can be any of the abstractions listed above) can be eliminated completely from the namespaces exposed to the SAE DUA through a "removal" enumeration DT.

For those common devices exposed in the SAE DUA, the operations that control those devices can be restricted to a limited subset. For example, for stable storage, an "Input/Output control operation (IOCt1)" that queries the storage capacity of the device can be allowed. On the other hand, by intercepting and filtering at the IOCt1 system call interface, the IOCt1 for formatting the device can be prohibited. Similarly, FSCTL_SET_REPARSE POINT or other esoteric file system operations silently fail.

The networking capabilities of Windows 2000 can be divided into functional areas, such as, TCP/IP networking ports, RPC ports, and local RPC ports and Names Pipes. The strategies for implementing each capability in the SAE are different.

In certain embodiments, for TCP/IP networking, a file-system filter driver for the Ancillary Function Driver ("AFD") file system" or a layer in the Transport Driver Interface ("TDI") stack can implement an interception and modification layer. This layer can restrict the networking in every DUA (the SAE DUA and the regular DUA) to resources only within that DUA by means of compartmentalization. That is, the SAE DUA can connect to ports in its compartment, the regular DUA can connect to ports in its compartment, but neither DUA can connect to a port in the other DUA's compartment. In certain embodiments, the interception and modification layer can also restrict and hide any IP address ranges and/or ports providing services.

In certain embodiments, compartmentalization may be used together with redirection. If the compartment is defined as a table of ports that exist in the SAE DUA, a second column in the table can be used to (optionally) identify the "real port" associated with a port number used in the SAE DUA. Requests to access a port in the SAE DUA can thus be redirected to alternate port numbers in order to avoid colliding with, or hampering, regular DUA activity.

In the Windows 2000 example, for RPC services identified by a 128-bit service id, compartmentalization and redirection can also be applied. Possible ways to implement this include a one-column table containing service ids for the SAE DUA or a two-column table containing GUIDs chosen at run-time and the service-ids they correspond to.

Local RPC ports (also known as "LRPC" and "Windows 2000 Native API ports") and Named Pipes are represented by alphanumeric (hierarchical) names of arbitrary length. LRPC and Named Pipe names can be tagged at the system call interface with a unique identifier that indicates that they are part of the SAE DUA namespace.

The file system abstractions of Windows 2000 include, for example, directories, files, and Universal Naming Convention ("UNC") networked file systems. In certain embodiments, rarely used abstractions, such as streams, hard links, and reparse-points/junctions, that are not supported on FAT32 may be prohibited in the SAE DUA. This sacrifices a small amount of rarely used functionality to gain simplicity and, thus, more manageable security and integrity.

The Windows 2000 registry namespace is analogous to the file system. Registry keys correspond to directories, and registry values to files. Therefore, principles of the present invention as discussed with respect to the file system may also be applied to the registry namespace.

The SAE DUA can interpose itself on any system call that refers to files, and apply one or more DTs on that call. The DTs may include, for example, an ADT that modifies the filename to point to a copy created by an UDT. In certain embodiments, a copying DT may choose not to copy certain files types (such as executable binaries) unless they are explicitly opened with write permissions. In certain embodiments, directory listing results may be subject to EnumDTs as RDTs.

The present invention also relates to computer readable media that include program instruction or program code for performing various computer-implemented operations based on the methods of the present invention. The program instructions may be those specially designed and constructed for the purposes of the invention, or they may be of the kind well-known and available to those having skill in the computer software arts. Examples of program instructions include for example machine code, such as produced by a compiler, and files containing a high level code that can be executed by the computer using, for example, an interpreter or equivalent execution engine to facilitate execution of high level code.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method of creating a secure application execution environment in a computer system comprising at least one resource, wherein access to the resource is governed by a concurrently executing user account, the method comprising:
- determining if the at least one resource is within the secure application execution environment; and,
- if the at least one resource is within the secure application execution environment,
  - determining a transformation rule for the at least one resource based on the user account; and
  - handling a request to access the at least one resource in accordance with the transformation rule for the at least one resource.

2. The method of claim 1, comprising:
if the at least one resource is not within the secure application execution environment, handling a request to access the at least one resource based on the user account.

3. The method of claim 1, comprising,
if the at least one resource is not within the secure application execution environment, adding the resource to the secure application execution environment.

4. The method of claim 3, wherein adding the resources to the secure application execution environment comprises:
dynamically determining a transformation rule for the at least one resource based on the user account and resource type.

5. The method of claim 4, wherein dynamically determining a transformation rule for the at least one resource comprises:
determining a transformation rule for the at least one resource based on the user account, resource type, and context of a request to access the at least one resource.

6. The method of claim 1, wherein the transformation rule specifies to copy at least some of the at least one resource to a new location relative to a root of the hierarchical namespace and access the copied resource in place of the at least one resource.

7. The method of claim 1, wherein the transformation rule assigns a unique identifier to a copy of the at least one resource and specifics to access the copied resource in place of the at least one resource.

8. The method of claim 1, wherein the transformation rule redirects a request to access the at least one resource to a substitute resource.

9. The method of claim 1, wherein the transformation rule specifies to mask some or all of the at least one resource and access the masked resource in place of the at least one resource.

10. The method of claim 1, wherein determining if the at least one resource is within the secure application execution environment comprises determining if the requested resource exists in a list and wherein handling a request to access the at least one resource in accordance with the transformation rule for the at least one resource comprises accessing the at least one resource if the at least one resource exists in the list.

11. A method of creating a secure application execution environment in a computer system that allows access to resources based on a concurrently executing user account, the method comprising:
- receiving a request to access a resource, to which access is governed by the user account, the request specifying the requested resource and an access type;
- dynamically determining a transformation rule for the requested resource based on the access type; and
- handling the request to access the resource in accordance with the transformation rule.

12. The method of claim 11, wherein dynamically determining a transformation rule for the at least one resource comprises:
determining a transformation rule for the at least one resource based on the user account, resource type, and context of request to access the at least one resource.

13. The method of claim 11, wherein the transformation rule specifies to copy at least some of the at least one resource to a new location relative to a root of the hierarchical namespace and access the copied resource in place of the at least one resource.

14. The method of claim 11, wherein the transformation rule assigns a unique identifier to a version of the at least one resource and specifies to access the version of the at least one resource instead of the at least one resource.

15. The method of claim 11, wherein the transformation rule redirects a request to access the at least one resource to a substitute resource.

16. The method of claim 11, wherein the transformation rule specifies to mask some or all of the at least one resource and access the masked resource in place of the at least one resource.

17. The method of claim 11, wherein determining the transformation rule comprises determining if the requested resource exists in a list and wherein handling the request to access the resource comprises accessing the requested resource if the requested resource exists in the list.

18. A method for creating a secure application execution environment in a computer system comprising at least one resource, the method comprising:
- generating a concurrently executing user account associated with the secure application execution environment, the user account comprising at least one resource within the secure application execution environment and, for each of the at least one resources in the secure application execution environment, at least one allowed access type and at least one derivation transformation;
- receiving a request to access a resource, the request specifying the requested resource and a requested access type; and
- accessing the requested resource based on the derivation transformation associated with the one of the at least one matching resources, if the requested access is allowable.

19. The method of claim 18, wherein accessing the requested access to the resource based on the derivation transformation associated with the one of the at least one matching resources, if the requested access is allowable comprises:
granting the requested access to the resource based on the derivation transformation associated with one of the at least one resources, if the requested resource matches one of the at least one resources in the user account.

20. A method of handling a request to access a resource in a computer system or network of computers, the method comprising:
- generating a table comprising window handles that are valid within a concurrently executing secure application execution environment;
- intercepting a system call comprising a window handle representing a resource that a user wishes to access;
- determining if the window handle exists in the table;
- granting access to the resource, if the window handle exists in the table; and
- refusing access if the window handle does not exist in the table.

21. A method for creating a secure application execution environment in a computer system comprising at least one resource, the method comprising:
  generating a concurrently executing first user account associated with the secure application execution environment, the first user account comprising at least one resource within the secure application execution environment and, for each of the at least one resources in the secure application execution environment, at least one allowed access type and at least one derivation transformation;
  generating a concurrently executing second user account based on the first user account comprising at least one resource within the secure application execution environment and, for each of the at least one resources in the first user account, at least one allowed access type and at least one derivation transformation;
  receiving a request to access a resource, the request specifying the requested resource and a requested access type; and
  accessing the requested resource based on the derivation transformation associated with the one of the at least one matching resources, if the requested access is allowable.

22. A method for creating a secure application execution environment in a computer system comprising at least one resource, the method comprising:
  generating at least one concurrently executing user account associated with the secure application execution environment, the at least one user account comprising at least one resource within the secure application execution environment and, for each of the at least one resources in the secure application execution environment, at least one allowed access type and at least one derivation transformation;
  intercepting a request to access a resource, the request specifying the requested resource and a requested access type; and
  if the requested resource is within the secure application execution environment,
  modifying the request based on the derivation transformation associated with the requested resource; and
  performing the modified request; and
  if the requested resource is not within the secure application execution environment, rejecting the request.

23. The method of claim 22, wherein rejecting the request comprises one of returning an error message, ignoring the request, or performing a substitute request.

24. An apparatus comprising:
  at least one memory having program instructions to execute an operating system; and
  at least one processor configured to execute the program instructions to perform the operations of:
  determining if the at least one resource is within the secure application execution environment; and,
  if the at least one resource is within the secure application execution environment,
  determining a transformation rule for the at least one resource based on a concurrently executing user account; and
  handling a request to access the at least one resource in accordance with the transformation rule for the at least one resource.

25. The apparatus of claim 24, the at least one processor further configured to perform the operation of:
  if the at least one resource is not within the secure application execution environment, handling a request to access the at least one resource based on the user account.

26. The apparatus of claim 24, the at least one processor further configured to perform the operation of:
  if the at least one resource is not within the secure application execution environment, adding the resource to the secure application execution environment.

27. The apparatus of claim 26, wherein adding the resources to the secure application execution environment comprises:
  dynamically determining a transformation rule for the at least one resource based on the user account and resource type.

28. The apparatus of claim 27, wherein dynamically determining a transformation rule for the at least one resource comprises:
  determining a transformation rule for the at least one resource based on the user account, resource type, and context of request to access the at least one resource.

29. The apparatus of claim 24, wherein the transformation rule specifies to copy at least some of the at least one resource to a new location relative to a root of the hierarchical namespace and access the copied resource in place of the at least one resource.

30. The apparatus of claim 24, wherein the transformation rule assigns a unique identifier to a copy of the at least one resource and specifies to access the copied resource in place of the at least one resource.

31. The apparatus of claim 24, wherein the transformation rule redirects a request to access the at least one resource to a substitute resource.

32. The apparatus of claim 24, wherein the transformation rule specifies to mask some or all of the at least one resource and access the masked resource in place of the at least one resource.

33. The apparatus of claim 24, wherein determining if the at least one resource is within the secure application execution environment comprises determining if the requested resource exists in a list and wherein handling a request to access the at least one resource in accordance with the transformation rule for the at least one resource comprises accessing the at least one resource if the at least one resource exists in the list.

34. An apparatus comprising:
  at least one memory having program instructions to execute an operating system; and
  at least one processor configured to execute the program instructions to perform the operations of:
  receiving a request to access a resource to which access is governed by a concurrently executing user account, the request specifying the requested resource and an access type;
  dynamically determining a transformation rule for the requested resource based on the access type; and
  handling the request to access the resource in accordance with the transformation rule.

35. The apparatus of claim 34, wherein dynamically determining a transformation rule for the at least one resource comprises:
  determining a transformation rule for the at least one resource based on the user account, resource type, and context of request to access the at least one resource.

36. The apparatus of claim 34, wherein the transformation rule specifies to copy at least some of the at least one resource to a new location relative to a root of the hierarchical namespace and access the copied resource in place of the at least one resource.

37. The apparatus of claim 34, wherein the transformation rule assigns a unique identifier to a version of the at least one resource and specifies to access the version of the at least one resource instead of the at least one resource.

38. The apparatus of claim 34, wherein the transformation rule redirects a request to access the at least one resource to a substitute resource.

39. The apparatus of claim 34, wherein the transformation rule specifies to mask some or all of the at least one resource and access the masked resource in place of the at least one resource.

40. The apparatus of claim 34, wherein determining the transformation rule comprises determining if the requested resource exists in a list and wherein handling the request to access the resource comprises accessing the requested resource if the requested resource exists in the list.

41. An apparatus comprising:
at least one memory having program instructions to execute an operating system; and
at least one processor configured to execute the program instructions to perform the operations of:
generating a concurrently executing user account associated with the secure application execution environment, the user account comprising at least one resource within the secure application execution environment and, for each of the at least one resources in the secure application execution environment, at least one allowed access type and at least one derivation transformation;
receiving a request to access a resource, the request specifying the requested resource and a requested access type; and
accessing the requested resource based on the derivation transformation associated with the one of the at least one matching resources, if the requested access is allowable.

42. The apparatus of claim 41, wherein accessing the requested access to the resource based on the derivation transformation associated with the one of the at least one matching resources, if the requested access is allowable comprises:
granting the requested access to the resource based on the derivation transformation associated with one of the at least one resources, if the requested resource matches one of the at least one resources in the user account.

43. An apparatus comprising:
at least one memory having program instructions to execute an operating system; and
at least one processor configured to execute the program instructions to perform the operations of:
generating a table comprising window handles that are valid within a concurrently executing secure application execution environment;
intercepting a system call comprising a window handle representing a resource that a user wishes to access;
determining if the window handle exists in the table;
granting access to the resource, if the window handle exists in the table; and
refusing access if the window handle does not exist in the table.

44. An apparatus comprising:
at least one memory having program instructions to execute an operating system; and
at least one processor configured to execute the program instructions to perform the operations of:
generating a concurrently executing first user account associated with the secure application execution environment, the first user account comprising at least one resource within the secure application execution environment and, for each of the at least one resources in the secure application execution environment, at least one allowed access type and at least one derivation transformation;
generating a concurrently executing second user account based on the first user account comprising at least one resource within the secure application execution environment and, for each of the at least one resources in the first user account, at least one allowed access type and at least one derivation transformation;
receiving a request to access a resource, the request specifying the requested resource and a requested access type; and
accessing the requested resource based on the derivation transformation associated with the one of the at least one matching resources, if the requested access is allowable.

45. An apparatus comprising:
at least one memory having program instructions to execute an operating system; and
at least one processor configured to execute the program instructions to perform the operations of:
generating at least one concurrently executing user account associated with the secure application execution environment, the at least one user account comprising at least one resource within the secure application execution environment and, for each of the at least one resources in the secure application execution environment, at least one allowed access type and at least one derivation transformation;
intercepting a request to access a resource, the request specifying the requested resource and a requested access type; and
if the requested resource is within the secure application execution environment, modifying the request based on the derivation transformation associated with the requested resource; and
performing the modified request; and if the requested resource is not within the secure application execution environment, rejecting the request.

46. The apparatus of claim 45, wherein rejecting the request comprises one of returning an error message, ignoring the request, or performing a substitute request.

47. A computer-readable medium containing instructions for controlling an operating system to perform a method comprising:
determining if the at least one resource is within the secure application execution environment; and,
if the at least one resource is within the secure application execution environment, determining a transformation rule for the at least one resource based on a concurrently executing user account; and
handling a request to access the at least one resource in accordance with the transformation rule for the at least one resource.

48. The medium of claim 47, comprising:
if the at least one resource is not within the secure application execution environment, handling a request to access the at least one resource based on the user account.

49. The medium of claim 47, comprising,
if the at least one resource is not within the secure application execution environment, adding the resource to the secure application execution environment.

50. The medium of claim 49, wherein adding the resources to the secure application execution environment comprises:
dynamically determining a transformation rule for the at least one resource based on the user account and resource type.

51. The medium of claim 50, wherein dynamically determining a transformation rule for the at least one resource comprises:
determining a transformation rule for the at least one resource based on the user account, resource type, and context of request to access the at least one resource.

52. A computer-readable medium containing instructions for controlling an operating system to perform a method comprising:
receiving a request to access a resource to which access is governed by a concurrently executing user account, the request specifying the requested resource and an access type;
dynamically determining a transformation rule for the requested resource based on the access type; and
handling the request to access the resource in accordance with the transformation rule.

53. The medium of claim 52, wherein dynamically determining a transformation rule for the at least one resource comprises:
determining a transformation rule for the at least one resource based on the user account, resource type, and context of request to access the at least one resource.

54. The medium of claim 52, wherein the transformation rule specifics to copy at least some of the at least one resource to a new location relative to a root of the hierarchical namespace and access the copied resource in place of the at least one resource.

55. The medium of claim 52, wherein the transformation rule assigns a unique identifier to a version of the at least one resource and specifies to access the version of the at least one resource instead of the at least one resource.

56. The medium of claim 52, wherein the transformation rule redirects a request to access the at least one resource to a substitute resource.

57. The medium of claim 52, wherein the transformation rule specifies to mask some or all of the at least one resource and access the masked resource in place of the at least one resource.

58. The medium of claim 52, wherein determining the transformation rule comprises determining if the requested resource exists in a list and wherein handling the request to access the resource comprises accessing the requested resource if the requested resource exists in the list.

59. The medium of claim 52, wherein the transformation rule specifies to copy at least some of the at least one resource to a new location relative to a root of the hierarchical namespace and access the copied resource in place of the at least one resource.

60. The medium of claim 52, wherein the transformation rule assigns a unique identifier to a copy of the at least one resource and specifies to access the copied resource in place of the at least one resource.

61. The medium of claim 52, wherein the transformation rule redirects a request to access the at least one resource to a substitute resource.

62. The medium of claim 52, wherein the transformation rule specifies to mask some or all of the at least one resource and access the masked resource in place of the at least one resource.

63. The medium of claim 52, wherein determining if the at least one resource is within the secure application execution environment comprises determining if the requested resource exists in a list and wherein handling a request to access the at least one resource in accordance with the transformation rule for the at least one resource comprises accessing the at least one resource if the at least one resource exists in the list.

64. A computer-readable medium containing instructions for controlling an operating system to perform a method comprising:
generating a concurrently executing user account associated with the secure application execution environment, the user account comprising at least one resource within the secure application execution environment and, for each of the at least one resources in the secure application execution environment, at least one allowed access type and at least one derivation transformation;
receiving a request to access a resource, the request specifying the requested resource and a requested access type; and
accessing the requested resource based on the derivation transformation associated with the one of the at least one matching resources, if the requested access is allowable.

65. The medium of claim 64, wherein accessing the requested access to the resource based on the derivation transformation associated with the one of the at least one matching resources, if the requested access is allowable comprises:
granting the requested access to the resource based on the derivation transformation associated with one of the at least one resources, if the requested resource matches one of the at least one resources in the user account.

66. A computer-readable medium containing instructions for controlling an operating system to perform a method comprising:
generating a table comprising window handles that are valid within a concurrently executing secure application execution environment;
intercepting a system call comprising a window handle representing a resource that a user wishes to access;
determining if the window handle exists in the table;
granting access to the resource, if the window handle exists in the table; and
refusing access if the window handle does not exist in the table.

67. A computer-readable medium containing instructions for controlling an operating system to perform a method comprising:
generating a concurrently executing first user account associated with the secure application execution environment, the first user account comprising at least one resource within the secure application execution environment and, for each of the at least one resources in the secure application execution environment, at least one allowed access type and at least one derivation transformation;
generating a concurrently executing second user account based on the first user account comprising at least one resource within the secure application execution environment and, for each of the at least one resources in the first user account, at least one allowed access type and at least one derivation transformation;

receiving a request to access a resource, the request specifying the requested resource and a requested access type; and accessing the requested resource based on the derivation transformation associated with the one of the at least one matching resources, if the requested access is allowable.

68. A computer-readable medium containing instructions for controlling an operating system to perform a method comprising:

generating at least one concurrently executing user account associated with the secure application execution environment, the at least one user account comprising at least one resource within the secure application execution environment and, for each of the at least one resources in the secure application execution environment, at least one allowed access type and at least one derivation transformation;

intercepting a request to access a resource, the request specifying the requested resource and a requested access type; and if the requested resource is within the secure application execution environment, modifying the request based on the derivation transformation associated with the requested resource; and performing the modified request; and if the requested resource is not within the secure application execution environment, rejecting the request.

69. The medium of claim 68, wherein rejecting the request comprises one of returning an error message, ignoring the request, or performing a substitute request.

* * * * *